US005527225A

United States Patent [19]

Dick

[11] Patent Number: 5,527,225
[45] Date of Patent: Jun. 18, 1996

[54] FULL TIME FOUR-WHEEL DRIVE SYSTEM

[75] Inventor: Wesley M. Dick, Ft. Wayne, Ind.

[73] Assignee: Dana Corporation, Toledo, Ohio

[21] Appl. No.: 238,443

[22] Filed: May 5, 1994

Related U.S. Application Data

[63] Continuation-in-part of Ser. No. 997,859, Dec. 29, 1992, Pat. No. 5,348,517.

[51] Int. Cl.⁶ .................................................. F16H 61/00
[52] U.S. Cl. .............................. 474/12; 474/18; 477/44; 180/251
[58] Field of Search ............................... 474/11, 12, 17, 474/18, 28; 477/44, 45, 46, 49; 180/248, 251

[56] References Cited

U.S. PATENT DOCUMENTS

| | | | |
|---|---|---|---|
| 1,072,165 | 9/1913 | Price | 180/366 |
| 2,219,249 | 10/1940 | Blagden et al. | 180/70 |
| 2,900,832 | 8/1959 | Snartemo | 74/230.17 |
| 3,032,133 | 5/1962 | Brown | 180/21 |
| 3,108,481 | 10/1963 | Westmont | 74/220 |
| 3,202,234 | 8/1965 | Osborne | 180/65 |
| 3,305,038 | 2/1967 | Carter | 180/50 |
| 3,331,464 | 7/1967 | Van Doorne | 180/14 |
| 3,772,927 | 11/1973 | Bertin | 74/217 R |
| 3,861,485 | 1/1975 | Busch | 477/41 X |
| 4,216,840 | 8/1980 | Dick | 180/70 R |
| 4,245,712 | 1/1981 | Itey-Bernard | 180/70 R |
| 4,304,150 | 12/1981 | Lupo et al. | 74/677 |
| 4,404,868 | 9/1983 | Kleine | 74/665 GE |
| 4,458,558 | 7/1984 | Frank | 74/665 GE |
| 4,534,748 | 8/1985 | Stieg et al. | 474/17 |
| 4,548,100 | 10/1985 | Höhn | 74/689 |
| 4,650,442 | 3/1987 | Parsons | 474/29 |
| 4,714,451 | 12/1987 | Yoshida et al. | 474/28 |
| 5,207,617 | 5/1993 | Kato et al. | 477/41 X |

FOREIGN PATENT DOCUMENTS

63-188526  8/1988  Japan .

Primary Examiner—Roger J. Schoeppel
Attorney, Agent, or Firm—Oldham & Oldham Co.

[57] ABSTRACT

A full time four-wheel drive system for a vehicle is described which utilizes a unique torque distributor subassembly which provides a torque differentiation function as well as a speed ratioing function, thereby permitting utilization with a torque transmitting subassembly which is greatly simplified relative to a conventional transmission. The torque distributor subassembly includes an input shaft for receiving output torque from a torque transmitting subassembly of a vehicle, a plurality of output shafts and means for connecting the input shaft to each of the output shafts. The connecting means comprises a plurality of continuously variable belt drives, each having a drive pulley mounted on the input shaft and driven thereby and a driven pulley mounted on one of the output shafts with the pulleys carrying a belt therebetween. Each pulley comprises a pair of sheaves which are axially moveable in relation to one another. The pair of sheaves of each pulley are caused to shift axially relative to one another by an electronic control system which is responsive to divide torque among the output shafts in a predetermined relationship and to further ratio speed between the input shaft and each of the output shafts in a predetermined relationship. The system operates to substantially maintain these predetermined relationships during normal operation of the vehicle, for improved vehicle handling, stability and feel.

10 Claims, 8 Drawing Sheets

FULL TIME FOUR-WHEEL DRIVE SYSTEM

CROSS-REFERENCES

This application is a continuation-in-part of application Ser. No. 07/997,859, filed Dec. 29, 1992 and entitled: "TORQUE TRANSFER CASE FOR A FULL TIME FOUR-WHEEL DRIVE SYSTEM" now U.S. Pat. No. 5,348,517.

BACKGROUND OF THE INVENTION

The present invention relates generally to a full time four-wheel drive system and, more particularly, to a full time four-wheel drive system including a torque distribution subassembly which provides automatic torque balancing, differentiation and speed ratioing functions.

Four-wheel drive systems for vehicles are being utilized to a greater extent, providing increased traction and safety of operation for the vehicle. Recently "full time" four-wheel drive systems have been developed for vehicles, wherein a transfer case is typically provided with an interaxle differential for dividing torque between the vehicle front and rear axle differentials. The torque transfer mechanisms to supply drive power to the four wheels of the vehicle are usually connected to a conventional vehicle transmission which is driven by the vehicle engine. As known in the art, conventional transmissions are typically complex in nature and expensive to manufacture due to the quantity and nature of the parts comprising the transmission. For instance, a conventional "automatic" transmission may typically include a plurality of hydraulically actuated multi-disc clutches, a plurality of shifting collars, and a plurality of planetary gear sets, wherein the planetary gear sets are particularly expensive to manufacture.

More recently, transfer case assemblies such as those disclosed in the commonly assigned copending application Ser. No. 07/997,859 have been developed which provide improved torque balancing and differentiation along with the ability to provide extra torque in the event of single wheel or single axle traction loss for improved mobility and stability in a full time four-wheel drive system associated with a vehicle. The transfer case assembly includes an input shaft receiving output torque from a conventional transmission and further includes a continuously variable drive belt connecting the input shaft to one of the output shafts of the transfer case assembly. Notwithstanding the advantages of these systems, automotive design engineers are continually seeking to simplify, and consequently reduce the cost of, vehicle drive train systems and to enhance the driveability of four-wheel drive vehicles.

SUMMARY OF THE INVENTION

The present invention is therefore directed to a full time four-wheel drive system for a vehicle having an engine for driving front and rear drive wheels, and a torque transmitting subassembly providing output torque to the front and rear drive wheels of the vehicle. The torque transmitting subassembly is greatly simplified relative to a conventional transmission. According to a preferred embodiment, the four-wheel drive system comprises a torque distributor subassembly including an input shaft for receiving output torque from a torque transmitting subassembly of a vehicle, a plurality of output shafts, and means for connecting the input shaft to each of the output shafts. The connecting means comprises a plurality of continuously variable belt drives, with each of the belt drives having a drive pulley mounted on the input shaft and driven thereby, and a driven pulley mounted on one of the output shafts. Each of the pulleys comprises a pair of sheaves with at least one sheave being axially moveable in relation to the other sheave of the pair, the pulleys carrying a belt therebetween. The pair of sheaves of each pulley are shifted axially relative to one another by means which are responsive to divide torque among the output shafts in a predetermined relationship and which are further responsive to ratio speed between the input shaft and each of the output shafts in a predetermined relationship. The means for shifting the pulley sheaves relative to one another may comprise an electronic control system having input signals corresponding to at least the torque of each of the output shafts, with the electronic control system controlling a plurality of adjustable mechanisms. Each of the adjustable mechanisms shift the moveable sheave of a corresponding one of the belt drives.

The plurality of output shafts may comprise a front and rear output shaft with each being connected to the input shaft via corresponding ones of a pair of continuously variable belt drives. The means for shifting the pulley sheaves is responsive to divide torque from the output shaft between the front and rear shafts in a predetermined relationship and to ratio speed between the input shaft and the front and rear output shafts in a predetermined relationship. According to an alternative embodiment of the present invention, the system includes a pair of front output shafts and a pair of rear output shafts, with each shaft being drivingly connected to either a front or rear wheel of the vehicle, and with each output shaft being connected to the input shaft via corresponding ones of four continuously variable belt drives which are provided. The means for shifting the pulley sheaves is responsive to divide torque from the input shaft among each of the output shafts in a predetermined relationship and to ratio speed between the input shaft and each of the output shafts in a predetermined relationship.

The main advantage of the four-wheel drive system of the present invention is the provision of both a differentiation function and a speed ratioing function by the torque distributor subassembly of the invention which permits utilization of a torque transmitting subassembly which is greatly simplified relative to a conventional transmission.

BRIEF DESCRIPTION OF THE DRAWINGS

These and other advantages of the present invention will become readily apparent to one skilled in the art from a reading of the following detailed description in conjunction with the attached drawings, wherein.

DETAILED DESCRIPTION OF THE INVENTION

Figure 1:
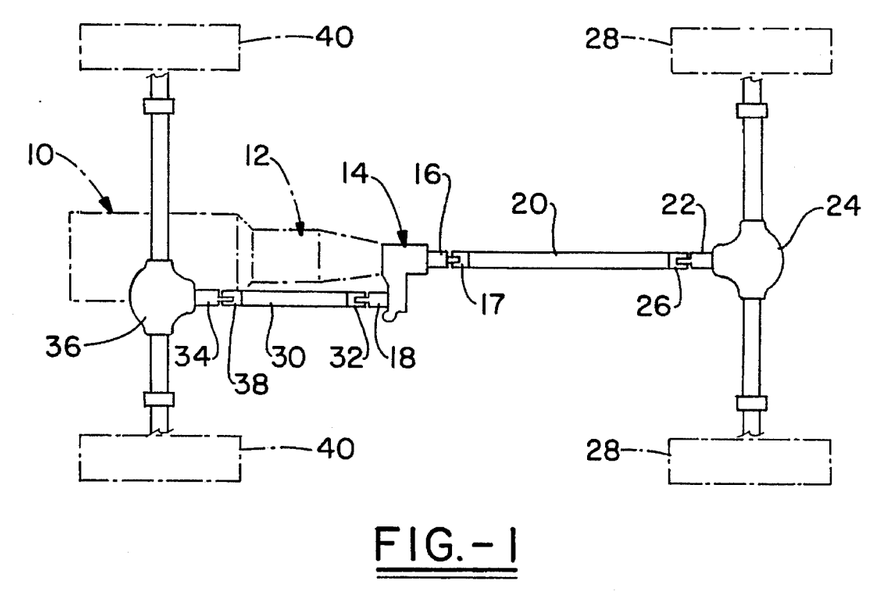
FIG. 1 is a top plan view of a four-wheel drive system which utilizes the transfer case of the invention.

Referring to FIG. 1, there is shown a vehicle four-wheel drive system which utilizes the transfer case of the invention. As shown in FIG. 1, a vehicle includes a drive engine 10, which is coupled with a transmission unit 12 of conventional configuration. The transmission unit 12 is secured to a transfer case 14 in accordance with the invention, which includes a rear output shaft or yoke 16 as well as a front output shaft or yoke 18. The rear output shaft 16 is connected to a rear drive shaft 20 by means of a universal joint connection, and drive shaft 20 is in turn connected to an input shaft or yoke 22 of a rear differential unit 24 by means of a universal joint coupling 26. The rear differential 24 is adapted to divide torque from the drive shaft 20 between the rear wheels 28 of the vehicle. Similarly, the front output shaft 18 of transfer case 14 is connected to the rearward end of a front drive shaft 30 by means of a universal joint coupling 32. The front drive shaft 30 has the forward end thereof connected to an input shaft or yoke 34 of a front differential unit 36 by means of a universal joint coupling 38. The front differential unit 36 is adapted to divide torque received from the front drive shaft 30 between the front wheels 40 of the vehicle.

Figure 2:
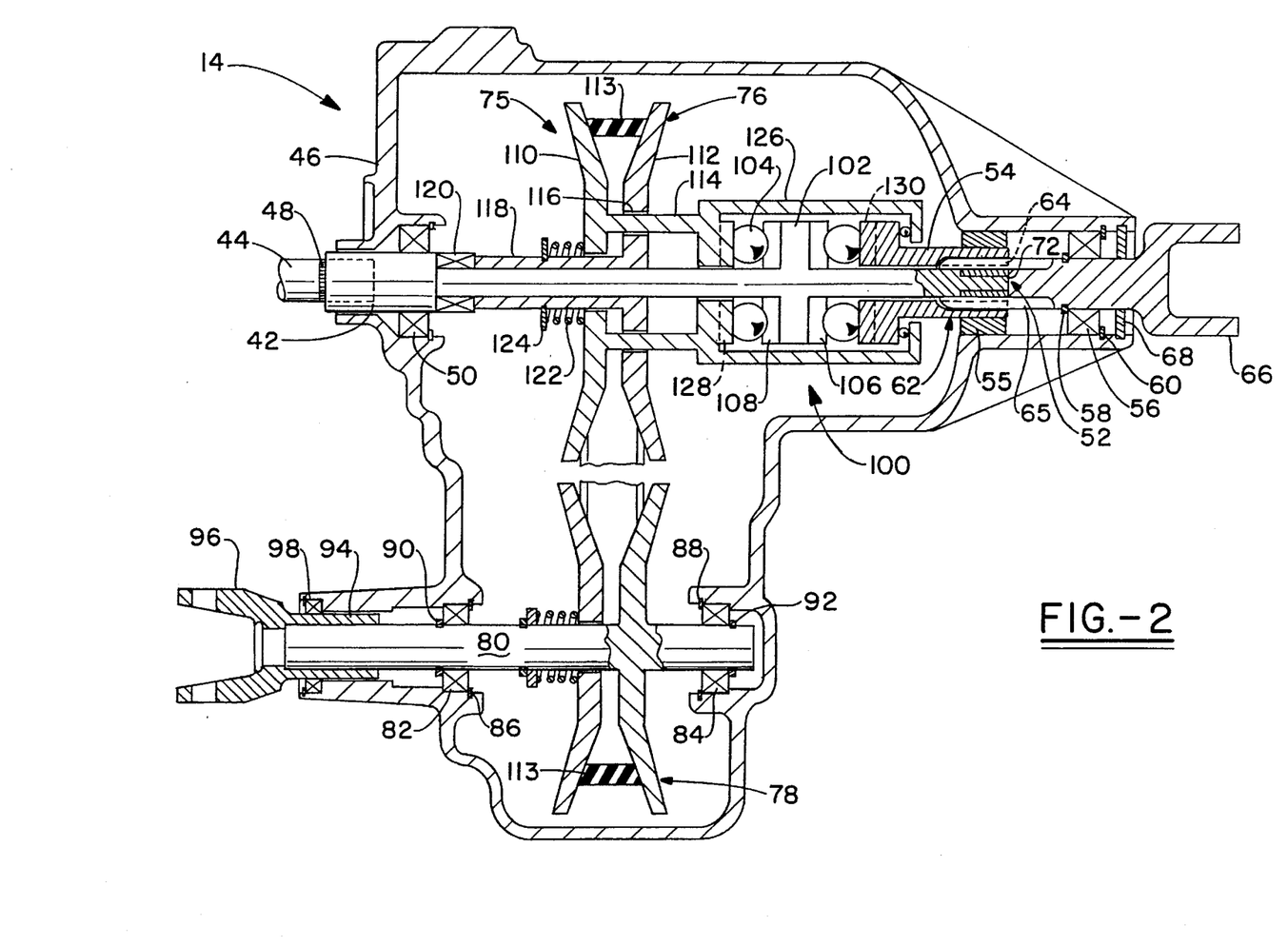
FIG. 2 is a sectional view through the transfer case assembly of the invention, illustrating a first embodiment of the invention.
Figure 3:
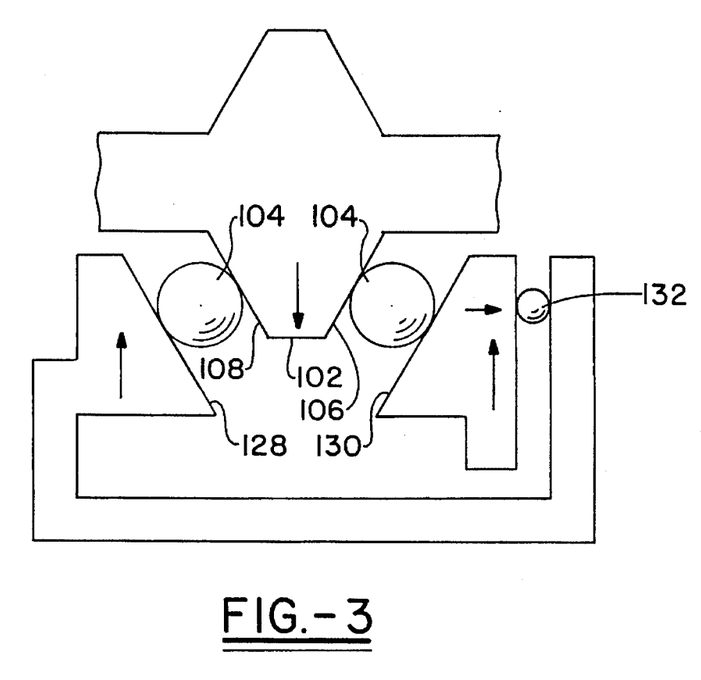
FIG. 3 is an enlarged partial sectional view through the ball ramp mechanism in the embodiment of FIG. 2.

Referring now to FIGS. 2 and 3, the specific construction of a first embodiment of the transfer case 14 of the invention will be discussed in more detail. As seen in FIG. 2, the transfer case 14 includes a torque input shaft which receives output torque from the vehicle transmission. The transfer case 14 includes an outer housing 46, which generally will include sections secured together by a plurality of bolts or the like. The transfer case input shaft 42 has a forward end connected to the rearward end of the transmission output shaft 44, by means of a spline connection at 48, which prevents relative rotation between output shaft 44 and input shaft 42. The forward end of the input shaft 42 is rotatably supported in the housing 46 by means of a ball bearing assembly 50. Further, the input shaft 42 is sealed within an opening provided in the front face of the housing 46 by annular seal means in a known manner. The input shaft 42 extends into the transfer case housing 46 and has a rearward end positioned within an annular recess 52 of a rear output shaft 54 of the transfer case assembly 14. An annular bushing 72 is mounted within the annular cavity 52 of the rear output shaft 54 to rotatably support the rear end of the input shaft 42 therein. The rear output shaft 54 comprises a slidable splined sleeve or collar section 62 coupled to a rear output yoke 66. The rearward end of sleeve 62 is provided with internal splines 64 which receive an external splined section 65 of rear output yoke 66. The rear output yoke 66 is a fixed yoke, and the collar 62 provides a slip spline in association with the rear output yoke 66 to allow relative axial movement between the slidable splined collar 62 and rear output yoke 66. In this configuration, the rear output yoke 66 is restrained from axial movement, with the slip spline enabling relative axial movement of section 62 in association with the ball-ramp mechanism 100 which will be hereinafter described. The slip spline may be formed in a known manner, and may use a ball-type spline or a glide-coat plastic having a low coefficient of friction. As an alternative, a slip yoke could be provided to allow axial movement of the rear output shaft 54. The rear output yoke 66 associated with rear output shaft 54 is rotatably supported within the rear of transfer case housing 46, by means of a bushing 55 and ball bearing assembly 56, which is secured relative to the yoke 66 by means of a snap ring 58 and relative to the housing 46 by means of a snap ring 60. The rear output shaft 54 is provided with external splines 64, and is adapted to receive a splined section of a rear output yoke 66. The rear output shaft 54, and particularly rear output yoke 66 is sealed with respect to a rear opening provided in the housing 46 by annular sealing means 68.

Also as seen in FIG. 2, there is provided a continuously variable v-belt drive which is supported on the torque input shaft 42 of the transfer case assembly 14. The continuously variable belt drive is generally indicated at 75, and includes a primary pulley 76 mounted in association with the input shaft 42, and a secondary pulley 78 mounted in association with a front output shaft 80. The front output shaft 80 is rotatably supported in the transfer case housing 46 by means of ball bearing assemblies 82 and 84 or other types of bearing assemblies in a known manner. The ball bearing assemblies 82 and 84 are secured relative to the housing 46 by means of snap rings 86 and 88, while being secured relative to the front output shaft 80 by means of snap rings 90 and 92. The forward end of the front output shaft 80 is provided with external splines 94 for receiving internal splines provided on a sleeve portion of a front output yoke 96 to prevent relative rotation therebetween. An annular seal assembly 98 is provided within a front opening in transfer case housings 46, to seal about the front output shaft 80 and corresponding front output yoke 96.

The continuously variable drive 75, including primary pulley 76 and secondary pulley 78, provides torque transfer from the torque input shaft 42 to the front output shaft 80. An adjusting mechanism, being a ball ramp assembly 100 in this embodiment, provides driving torque which is transferred to the rear output shaft 54 from input shaft 42 assembly through a ball ramp assembly 100. In the ball ramp system 100, the torque input shaft 42 carries a first ball ramp portion 102 extending radially from the shaft and acting upon a plurality of ball bearings 104 in a dual ball ramp configuration. As seen in FIG. 3, the ball ramp portion 102 of input shaft 42 includes two ramp bearing surfaces 106 and 108 acting on a pair of balls 104. Corresponding to this structure, the primary pulley 76 comprises a moveable sheave 110 and a fixed sheave 112, which are relatively slidable in relation to one another in an axial direction. The hub portion 114 of the moveable sheave 110 is adapted to extend through an annular opening 116 in the fixed sheave 112 as shown in FIG. 2. The hub portion 118 of the fixed sheave 112 is rotatably mounted on the torque input shaft 42 by means of a ball bearing assembly 120. The hub portion 118 of the fixed sheave 112 also carries a bias spring member 122, which is fixed in position by means of a snap ring 124. The bias spring member 122 is adapted to act on the moveable sheave 110, such that the spring member 122 actuates and biases the moveable sheave 110, imparting a force which acts to squeeze sheaves 110 and 112 together. In association with hub portion 114 of the moveable sheave 110, an extension generally indicated at 126 includes a ball ramp portion 128, which together with ball ramp portion 102 of the input shaft 42, forms a load camming mechanism for torque transfer through the continuously variable drive 75 to the front output shaft 80 of transfer case 14. Similarly, rear output shaft 54 includes a ball ramp portion 130 which together with ball ramp portion 106 of the input shaft 42 form a load cam mechanism for actuating torque transfer from the input shaft 42 to rear output shaft 54. The extension 126 of hub portion 114 associated with the moveable sheave 110 also extends beyond the ramp portion 130 associated with output shaft 54, and is rotatably coupled thereto by means of a ball bearing assembly 132. The rear output shaft 54, and particularly splined sleeve section 62, is free to move axially relative to the torque input shaft The slip spline provided between the input shaft 42 and splined sleeve 62 enables sleeve 62 to move in association with the ball ramp mechanism 100, with axial movement limited by the degree of movement of the moveable sheave 110 associated with primary pulley 76 and the extension of moveable sheave 110.

The ball ramp assembly 100 of the invention transfers torque from the input shaft 42 to the rear output shaft 54 via the rear ball ramp mechanism consisting of ramp portions 106 and 130 and the associated ball 104 disposed therebetween. The amount of torque transferred to the rear output shaft will depend upon the angle established on the ramp portions 106 and 130. Similarly, transfer of torque from the input shaft 42 to the front output shaft 80 of transfer case 14 is provided by means of the continuously variable drive 75. Transfer of torque to the front output shaft 80 via the continuously variable belt drive 75 will depend upon the position of the moveable sheave 110 relative to the fixed sheave 112 of the primary pulley 76. It should be recognized, that the angles of the ball ramp systems will determine the distribution of torque transferred to both the rear output shaft 54 and front output shaft 80, to allow any desired torque split between the front and rear output shafts. Although the ramps shown in FIGS. 2 and 3 are symmetrical, indicating an even torque split between front and rear output shafts under normal operating conditions, it is contemplated that an uneven torque split is achieved by merely varying the angles of the ramps acting on the respective front or rear output shafts if desired. For example, if a vehicle is desired to maintain a rear drive feel a two-thirds to one-third distribution is chosen, with the high torque side driving the rear output shaft 54, while at the same time achieving the front wheel drive's front traction advantage in a four-wheel drive system.

Figure 4:
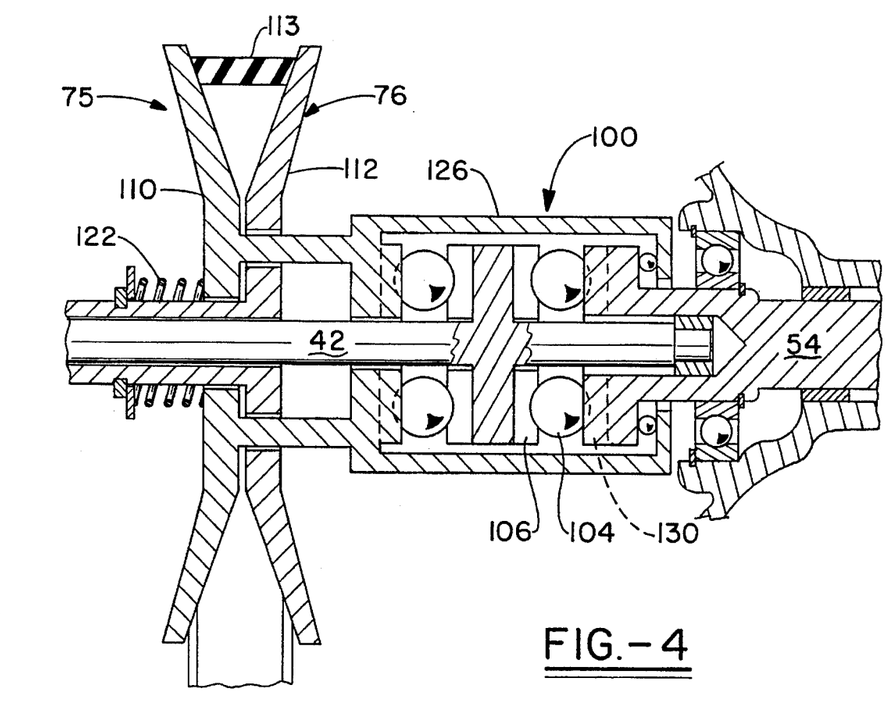
FIG. 4 is an enlarged partial sectional view taken of the transfer case assembly, illustrating the transfer of additional torque to the front output shaft.

The ball ramp configuration of the invention also achieves balancing of torque in the desired and predetermined ratio between the rear output shaft 54 and front output shaft 80 driven by the continuously variable belt drive 75. This balancing of torque distribution between the front and the rear output shafts of the transfer case will be seen more distinctly in FIGS. 4 and 5. As seen in FIG. 4, the primary pulley 76 is shown, and reflects the torque balancing effect of the ball ramp mechanism associated with this embodiment of the invention. Although the secondary pulley of the continuously variable drive 75 is not shown, it should be understood that it corresponds to actuation of the primary pulley 76 to effect variable drive of the front output shaft 80 as previously described. In operation, the transfer case of the invention will distribute torque from the input shaft 42 to the front and rear output shafts in a predetermined relationship, and the ball ramp mechanism will continuously act to balance torque between the output shafts according to this predetermined relationship. In FIG. 4, there is illustrated the ability to transfer additional torque to the front output shaft 54 to compensate for an increased torque on the rear output shaft. In operation, if an increased torque is applied to the rear output shaft due to cornering or other operational characteristic of the vehicle, additional torque will be transferred through the ball ramp system including ramps 106 and 130 and the associated ball 104. This increased torque will result in the ball 104 traveling on ramps 106 and 130 in a manner such that the moveable sheave 110 would be urged toward the fixed sheave 112 by movement of the sheave extension 126 toward rear output shaft 54 in association with axial movement of shaft 54. The bias spring member 122 will facilitate actuation of the moveable sheave 110 resulting in a configuration of the primary pulley 76 as seen in FIG. 4. As the moveable sheave 110 is urged toward the fixed sheave 112, the belt 113 will be urged upwardly within sheaves 110 and 112, such that the system will try to overdrive the front output shaft. In this configuration of the continuously variable drive 75, if the front output shaft is restricted by the pavement on which the wheels of the vehicle travel, then torque transfer from the input shaft 42 to the front output shaft will be increased, and torque between the front and rear output shafts will be balanced.

Figure 5:
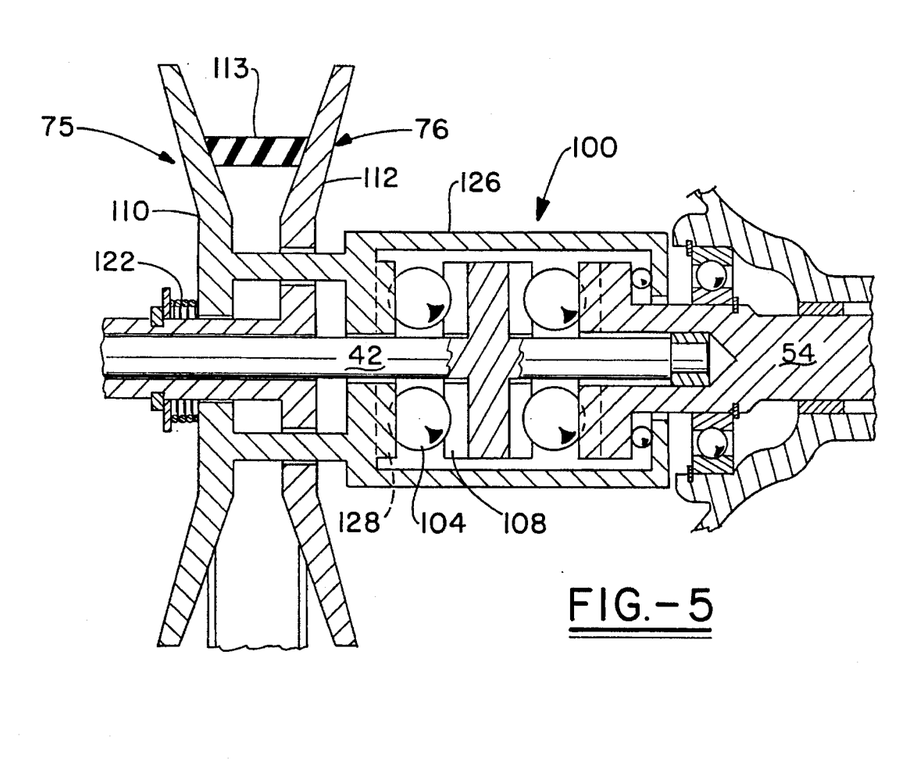
FIG. 5 is an enlarged partial sectional view through the transfer case assembly, illustrating the transfer of additional torque to the rear output shaft.

Conversely, as seen in FIG. 5, if more torque is experienced on the front output shaft, the additional torque would operate on the ball ramp assembly comprising ramps 108 and 128 and the associated ball 104. As the ball 104 travels on ramps 108 and 128, this would urge the sheave extension 126 associated with moveable sheave 110 away from the rear output shaft 54, resulting in shifting of the moveable sheave 110 away from the fixed sheave 112 as seen in FIG. 5. In this condition, the torque transfer to the front output shaft via the continuously variable drive 75 is reduced, tending to overdrive the rear output shaft 54. Again, if the speed of the rear output shaft is restricted by the pavement, then the torque transferred to the rear output shaft 54 will be increased to effect balancing of torque between the front and rear output shafts.

The continuously variable drive 75 provides differentiation between the front and rear output shafts as desired. Normal vehicle cornering produces a certain amount of required differentiation, which is suitably provided by the continuously variable drive 75. The differentiation required for normal vehicle cornering also must be distinguished from wheel slip or spin, and the continuously variable drive 75 is configured such that its limits correspond to parameters associated with normal differentiation due to cornering. Normal differentiation is defined as that which can occur in a corner of a given radius before a "skid-out" speed is reached. The control of the ratio of torque transfer from the torque input shaft to the front and rear output shafts allows for normal differentiating due to steer angle and wheel or tire radius variations, and the dual ball ramp assembly will effectively balance torque transfer to substantially maintain the predetermined ration between the front and rear shafts.

In addition to providing normal interaxle differentiation, the transfer case assembly of this embodiment also provides traction enhancement. When a front or rear wheel spins out due to a low coefficient surface, more torque will be delivered to the opposite axle which is on a less slippery surface. This traction enhancement increases the ability of the vehicle to move itself and to improve vehicle handling and stability. In the present invention, traction enhancement is obtained upon the occurrence of a predetermined amount of wheel slip, which correlates to the maximum speed of the continuously variable belt drive 75. As the continuously variable torque transfer arrangement inherently has limits in the amount of torque which can be transferred, this limit is utilized to provide additional torque transfer upon the occurrence of a single wheel or single axle traction loss, to provide additional traction to the output shaft where no traction loss has occurred and enhance mobility of the vehicle. This traction enhancement is provided by the dual ball ramp assembly, and occurs after a predetermined amount of wheel slip correlating to the maximum speed of the continuously variable drive. Upon the occurrence of a wheel slip, the torque applied to the corresponding output shaft associated with that wheel will drop off, and the balancing function of the ball ramp mechanism 100 as previously described will be actuated. It should be recognized that upon actuation of the torque balancing function, it is possible that the maximum speed of the continuously variable belt drive 75 will be reached, wherein the balancing function will no longer result in additional torque being transferred to the output shaft associated with the wheel slip. When the limits of the continuously variable drive are exceeded, additional torque will then be delivered to the opposite output shaft and axle which is on a less slippery surface.

Figure 6:
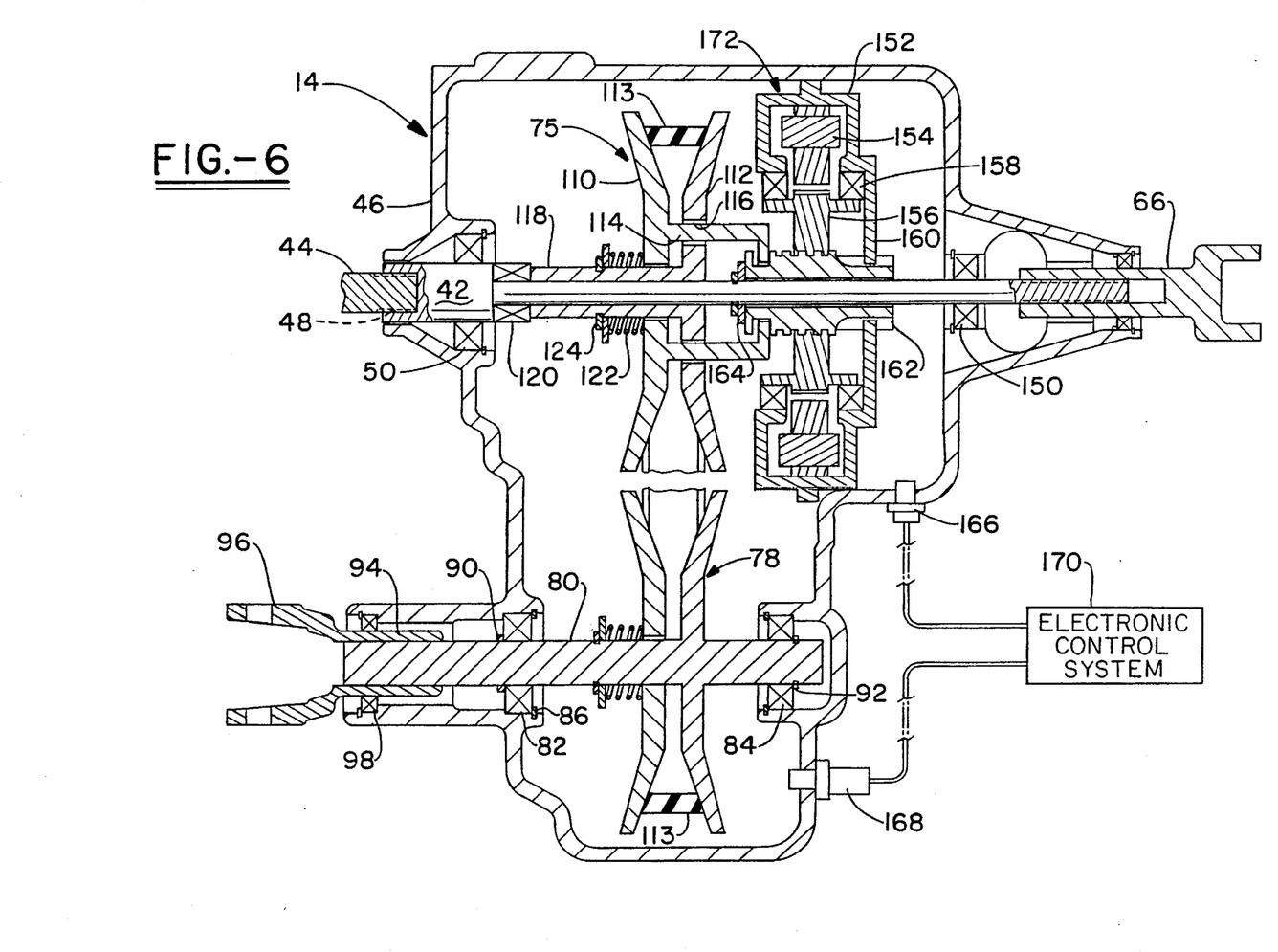
FIG. 6 is a sectional view through the transfer case assembly, illustrating an alternative embodiment of the invention.

Turning now to FIG. 6, an alternative embodiment of the invention is shown to include an electronic control system adapted to monitor the torque of both the front and the rear output shafts of the transfer case assembly, and to control operation of the continuously variable drive 75 associated with the interaxle transfer case. In this embodiment, only distinctions between this and the embodiment of FIGS. 2–5 will be referred to, and common reference numerals will be used for common components of the transfer case assembly.

Electronic control of torque distribution may provide better mobility and handling characteristics in that the limits of the continuously variable drive system would not need to be exceeded in order to transfer additional torque in the event of traction loss. In accordance with this embodiment, the input shaft 42 extends into the transfer case housing 46 and has its rearward end coupled to rear output yoke 66. The input shaft 42 rotatably supported within housing 46 by ball bearing assemblies 50 adjacent the front end, and ball bearing assemblies 150 positioned adjacent the rear end of input shaft 42. The input shaft 42 is coupled to the rear output yoke 66 by means of a spline connection, to prevent relative rotation therebetween. Similarly, the front output shaft 80 is drivingly engaged to the input shaft 42 by means of the continuously variable belt drive 75 as previously described. The torque of the rear output shaft 54 is monitored by means of a torque sensor 166 which may be any conventional means to sense the torque of shaft 54. Similarly, the torque of the front output shaft 80 is monitored by means of a torque sensor 168 as part of an electronic control system. The outputs of the torque sensors 166 and 168 are connected to an electronic control system, generally indicated at 170 which includes processing means to determine the torque on the output shafts. The electronic control system 170 in turn controls an adjusting mechanism generally indicated at 172. The adjusting mechanism 172 is adapted to act upon the hub extension 114 of moveable sheave 110, to effect shifting of moveable sheave 110 relative to fixed sheave 112 associated with primary pulley 76 of the continuously variable drive 75. In this manner, distribution of torque from the input shaft 42 can be effectively-controlled in response to the detected torques of both the front output shaft 80 and rear output shaft 54 in the system. Shifting of moveable sheave 110 by means of adjusting mechanism 172 is performed in response to the detected torques sensed form the front and rear output shafts to properly distribute torque in the desired manner.

As shown in FIG. 6, the adjusting mechanism 172 may comprise an electric motor device positioned around the input shaft 42, being controlled by the electronic control system 170. The adjusting mechanism 172 may thus comprise a motor housing 152 supported within transfer case housing 46. The motor housing 152 includes field windings or stator windings 154 positioned relative to an armature or rotor 156 which is supported relative to motor housing 152 by means of ball bearing assemblies 158 or the like. The electronic control system 170 will provide actuating power to the stator windings 154 of the motor assembly to produce rotation of the armature 156 relative to stator 154 and motor housing 152. The motor housing 152 further includes an extension 160 which is splined or tanged onto a rotatable sleeve 162 which cooperates with hub extension 114 of moveable sheave 110. The armature 156 is also provided with external threads which mate with the threaded portion of shift collar or sleeve 162. Upon actuation of the motor, the armature 156 will be made to rotate, which will in turn cause axial movement of the shift collar 162. The shift collar 162 is restrained from rotation by means of the housing extension 160, but the spline connection will allow axial movement of collar 162. In this configuration, it should be recognized that the armature 156 may be rotated in alternative directions to effect axial movement of shift collar 162 and resulting movement of movable sheave 110 by means of hub extension 114. The hub portion 114 of movable sheave 110 may be connected to shift collar 162 by means of a washer and snap-ring assembly shown at 164.

Although the adjusting mechanism 172 is described as an electric motor device to perform shifting of moveable sheave 110 in the variable drive 75, the adjusting mechanism 172 may be of any suitable type, including electronic, hydraulic, or pneumatic mechanisms to effect shifting of moveable sheave 110 relative to fixed sheave 112 of pulley 76. In this manner, torque distribution to the front and rear output shafts is regulated as a function of the measured torque, which may result in an improved control system as the limits of the continuously variable drive 75 would not need to be exceeded in order to transfer additional torque when necessary.

Figure 7:
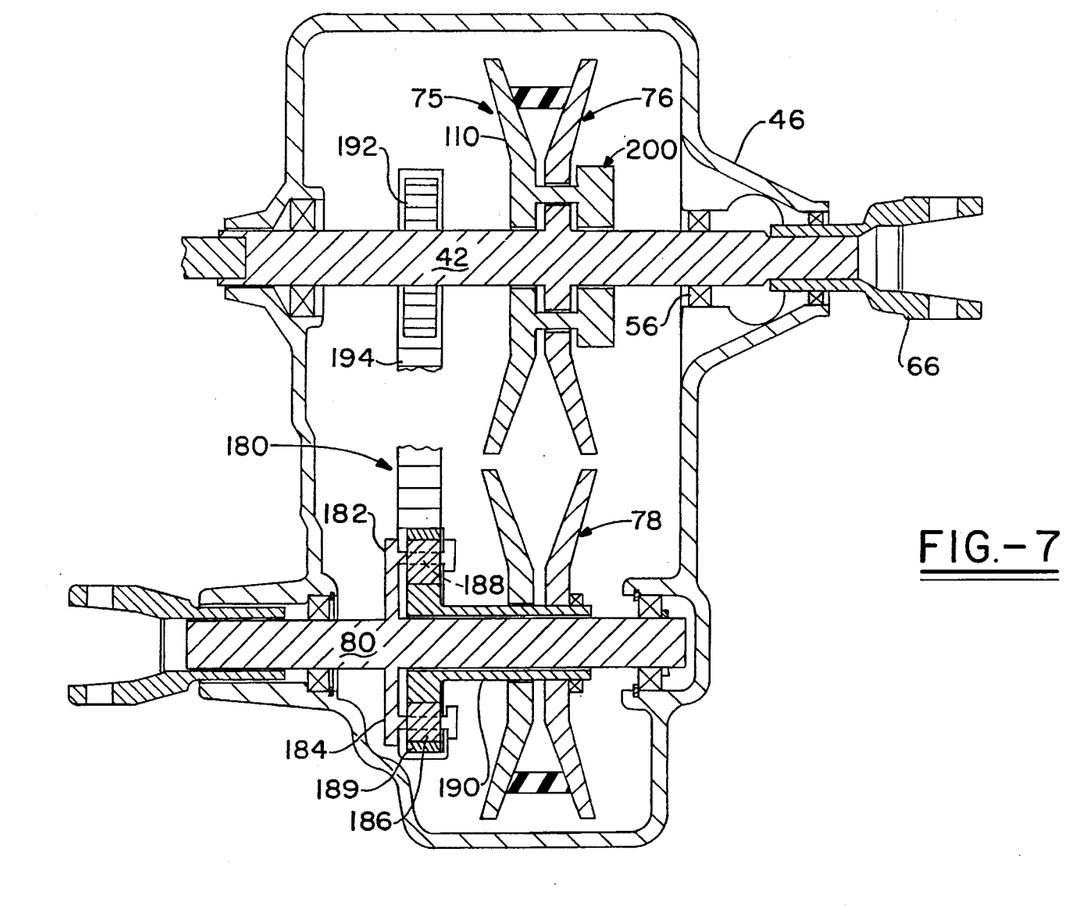
FIG. 7 is a sectional view through the transfer case assembly, illustrating yet another embodiment of the invention.

Turning now to FIG. 7, an alternate embodiment of the invention is shown to include a dual-path torque transmission arrangement. In this embodiment, only distinctions between the previous embodiments will be referred to, and common reference numerals will be used for common components. As previously mentioned, it is possible in some vehicles that using the continuously variable drive to effect torque transfer in a predetermined relationship between front and rear output shafts may result in the limits of the continuously variable drive being exceeded under abnormal operating conditions of the vehicle. Due to the limitations of continuously variable drive technology, it may therefore be desirable to provide a fixed drive mechanism which is used in parallel with the continuously variable drive to transmit a fixed amount of torque from the input shaft to the front and rear output shafts of the transfer case. The continuously variable drive is used to transmit a varying amount of additional torque in the dual path torque transfer arrangement, to achieve an increase in torque of several times or the reduction in the size of continuously variable drive required. The torque transferred by the constant drive can be set to eliminate the possibility that the limits of the continuously variable drive will be exceeded, even under conditions of wheel slip or the like. In this embodiment, the input shaft 42 carries a conventional chain-belt drive generally indicated at 180 for rotation therewith. The chain-belt drive 180 is in turn coupled to a planet-gear arrangement 182 mounted in association with the front output shaft 80 in the transfer case. The planetary gear set 182 includes a planet carrier 184 formed integrally with front output shaft 80 or coupled thereto by means of spline connection to prevent relative rotation between the planet carrier 184 and front output shaft 80. The planet carrier 184 carries a plurality of circumferentially spaced apart planet gears 186, each of which are rotatably mounted about a separate shaft 188. The planetary gear set 182 further includes a ring gear 189 which will include internal ring gear teeth which engage the gear teeth of each of the planet gears 186. The planet gear set 182 further includes a sun gear 190 rotatably mounted on the front output shaft 80. In this embodiment, the chain belt of drive 180 is connected to the ring gear of the planetary gear set 182 to transfer torque from the input shaft 42 to ring gear 189 via the sprocket set 192 mounted on input shaft 42 which carries the chain belt 194 thereon. Torque from the input shaft 42 will therefore be transferred in a predetermined relationship through the ring gear 189 and planetary gears 186 in the planetary gear set to transfer torque to the carrier 184 and to front output shaft 180 in predetermined relationship. Further, the sun gear 190 of the planetary gear set 182 has supported thereon the pulley 78 associated with the continuously variable belt drive 75. The continuously variable belt drive mechanism 75 is therefore connected to the sun gear 190 of the planetary gear set to transfer the desired amount of torque from the input shaft 42 to the rear output of the transfer case assembly. In this embodiment, the input shaft 42 has a rear output yoke 66 mounted thereon, and is rotatably supported within transfer case housing 46 by means of ball bearings 56. The torque transferred to the rear output yoke 66 will vary depending upon the continuously variable drive 75 in the transfer case assembly. As described in previous embodiments, the continuously variable belt drive 75 may be controlled by the ball ramp mechanism or alternatively by the electronic control system as desired. In the embodiment of FIG. 7, the adjusting mechanism to shift moveable sheave 110 of the continuously variable drive 75 is shown in block form and generally indicated at 200, and may comprise each of the embodiments previously described.

In the preferred embodiment, more torque will be transferred through the chain drive 180 to the ring gear 189, than through sun gear 190. For example, two-thirds of the input torque will be transferred through the ring gear, while one-third of the input torque transferred through the sun gear so as to reduce the requirements of the continuously variable drive in the system. In this embodiment, control of torque transfer to both the front and rear output shafts is maintained in a manner similar to the embodiments previously described. Input torque can be divided in a predetermined relationship between the front and the rear outputs, while the chain drive yields the ability to transfer increased torque without the limits of the continuously variable drive being exceeded. Thus, the arrangement again provides differentiation, torque balance, and traction enhancement in the event of a predetermined amount of wheel slip.

Figure 8:
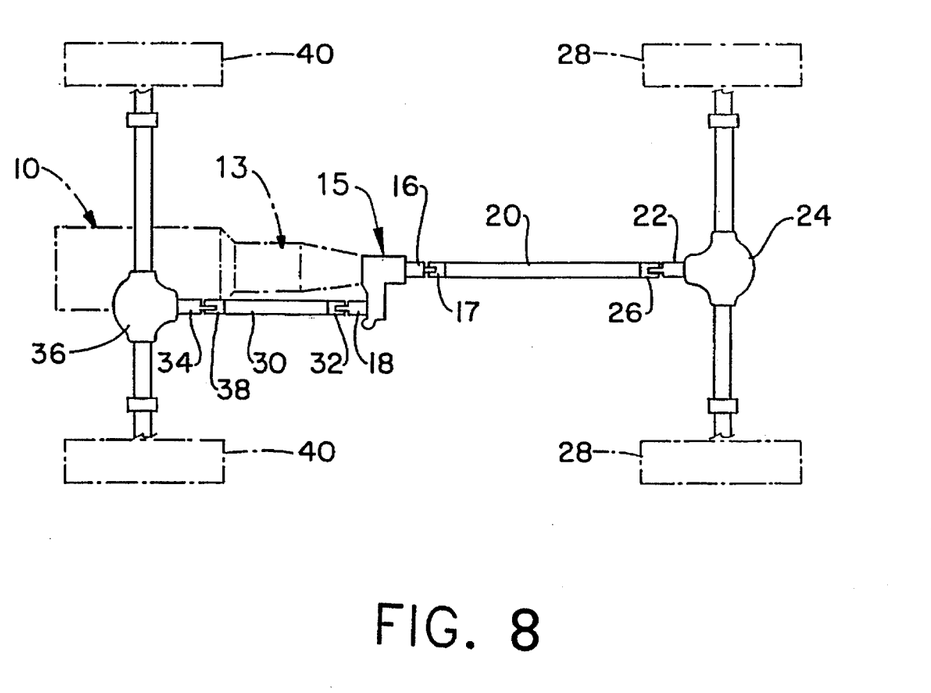
FIG. 8 is a top plan view of a four-wheel drive system which schematically illustrates still another alternative embodiment of the invention.
Figure 9:
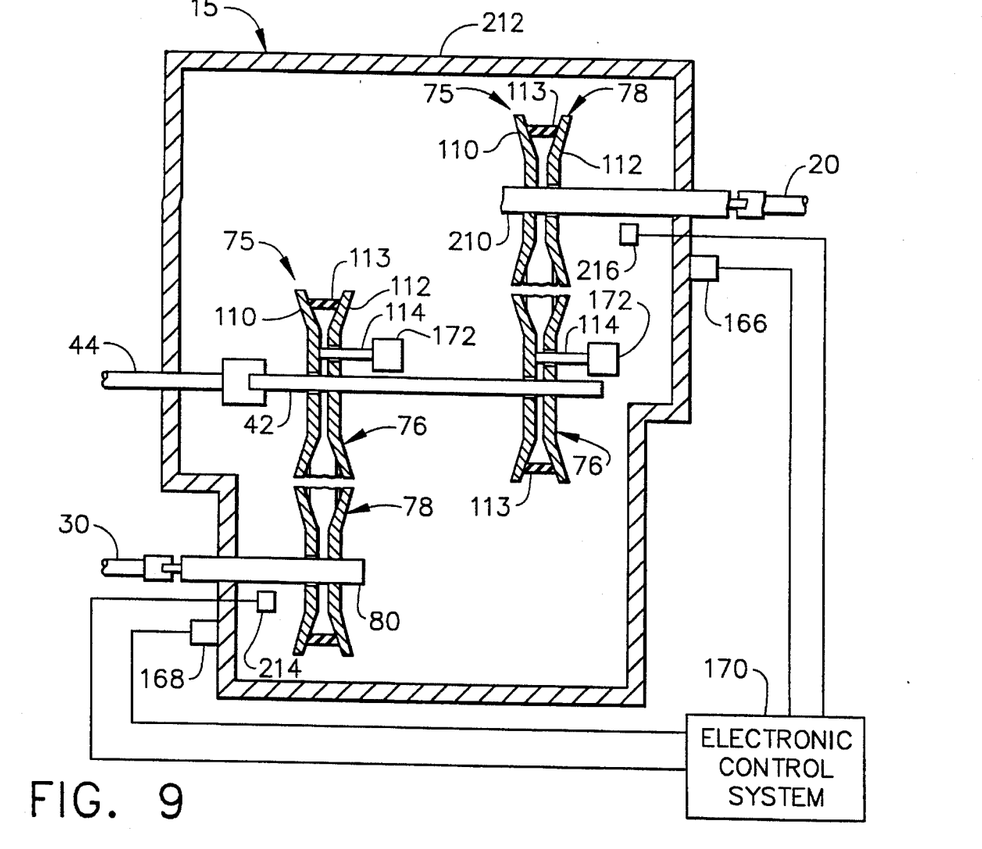
FIG. 9 is a cross-sectional view schematically illustrating the torque distribution subassembly of FIG. 8.

Referring now to FIGS. 8 and 9, an alternate embodiment of the invention is illustrated which includes a torque distributor subassembly 15 in place of the transfer case 14 of the previous embodiments. In this embodiment, only distinctions between the previous embodiments will be discussed in detail, and common reference numerals will be used for common components. Torque distributor subassembly 15 provides both a torque differentiation function and a speed ratioing function. Consequently, the torque distributor subassembly 15 may be used in conjunction with a torque transmitting subassembly 13 which is greatly simplified relative to a conventional transmission such as transmission 14 of the previous embodiments. Although the details of the transmission 14 of previous embodiments or those of the torque transmitting subassembly 13 of this embodiment do not comprise a part of this invention, the fact that the much simplified torque transmitting subassembly 13 may be used in lieu of a conventional transmission, is a direct and advantageous result of the torque distributor subassembly 15 of this embodiment providing a speed ratioing function, normally provided by a conventional transmission, as described more fully hereinafter. Similar to the transfer case assembly 14 of previous embodiments, torque distributor subassembly 15 also provides a torque differentiation function, which eliminates the need for a conventional interaxle differential.

Turning now to FIG. 9, the details of the torque distributor subassembly 15 shown in FIG. 8 may be appreciated in greater detail. Torque distributor subassembly 15 includes an input shaft 42 for receiving output torque from output shaft 44 of torque transmitting subassembly 13. Torque distributor subassembly 15 further includes a front output shaft 80 and a rear output shaft 210. Shafts 80 and 210 are each connected to input shaft 42 by a continuously variable drive 75. Each continuously variable drive 75 includes a primary or drive pulley 76 mounted on input shaft 42 and a secondary or driven pulley 78 which is mounted on either shaft 80 or shaft 210. Each of the pulleys comprises a pair of sheaves 110 and 112 which are axially movable in relation to one another so as to vary the effective pulley diameters of drive pulleys 76 and driven pulleys 78.

An electronic control system 170 is provided to effect shifting of moveable sheave 110 relative to the corresponding fixed sheaves 112 of each belt drive 75, wherein electronic control system 170 controls a pair of adjusting mechanisms generally indicated at 172. Each adjustable mechanism 172 is adapted to act upon a hub extension 114 of moveable sheave 110 to effect shifting of moveable sheave 110 relative to fixed sheave 112 associated with the primary pulley 76 of each of the continuously variable belt drives 75. Adjusting mechanisms 172 may again comprise an electric motor device and associated constituent elements as described previously with respect to the adjusting mechanism 172 illustrated in FIG. 6 or another suitable mechanism. It should be further understood that moveable sheaves 110 are biased with spring members 122 (not shown in FIG. 9) in the same manner as that described with respect to previous embodiments and it should be further understood that output shafts 80 and 210 are rotatably supported within housing 212 of subassembly 15 by conventional bearing assemblies in the same manner that shafts 42 and 80 are journaled to housing 46 of transfer case 14 illustrated in FIG. 6.

Electronic control system 170 receives input signals from included torque sensors 166 and 168 which are positioned adjacent rear output shaft 210 and front output shaft 80, respectively, so as to measure the torque on each of the output shafts 210 and 80. Speed sensors 214 and 216 measuring the speed of output shafts 80 and 210 also provide input signals to control system 170. It is also noted that the output from a sensor (not shown) which measures steering wheel angle may be input to electronic control system 170. Electronic control system 170 shifts the moveable sheave 110 of each belt drive 75 by means of adjustable mechanisms 172 in response to the detected torques and speeds of front output shaft 80 and rear output shaft 210 as measured by torque sensors 168 and 166 and speed sensors 214 and 216, respectively, so as to divide torque from input shaft 42 between output shafts 80 and 210 in a predetermined relationship and to ratio speed between input shaft 42 and each of output shafts 80 and 210 in a predetermined relationship. Accordingly, torque distributor subassembly 15 and electronic control system 170 combine to provide not only a torque differentiation function but also provide a speed ratioing function normally provided by a conventional transmission. Accordingly, torque transmitting subassembly 13 may be greatly simplified relative to a conventional transmission. Although not shown, the elements of torque transmitting subassembly 13 would include a fluid coupling which is required for starting the vehicle, as known in the art, and a reversing gear mechanism for allowing the direction of the vehicle to be changed, with these elements being common to a conventional transmission. However, unlike a conventional transmission, torque transmitting subassembly 13 does not include a plurality of multi disc clutches, planetary gear sets and shifting collars typically found in a conventional transmission to accomplish a speed ratioing function. Accordingly, the cost and complexity of torque transmitting subassembly 13 is greatly reduced relative to a conventional transmission.

Figure 10:
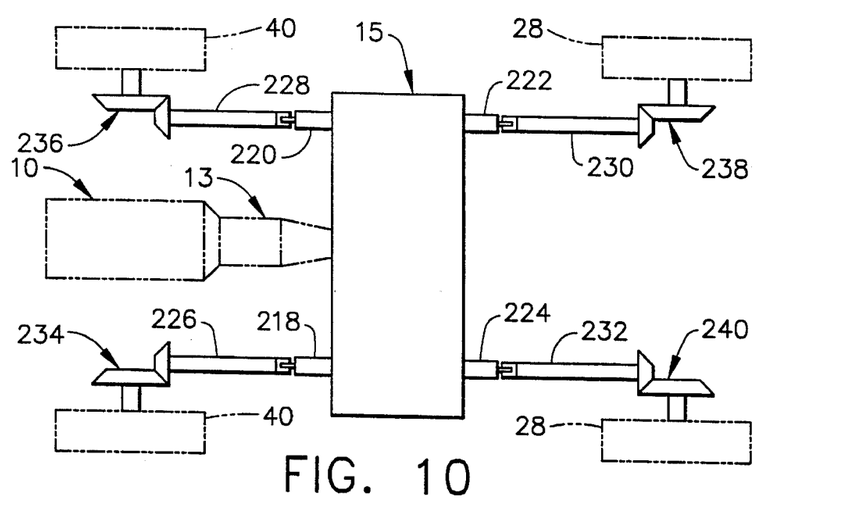
FIG. 10 is a top plan view of a four-wheel drive system which schematically illustrates yet another alternative embodiment of the invention.
Figure 11:
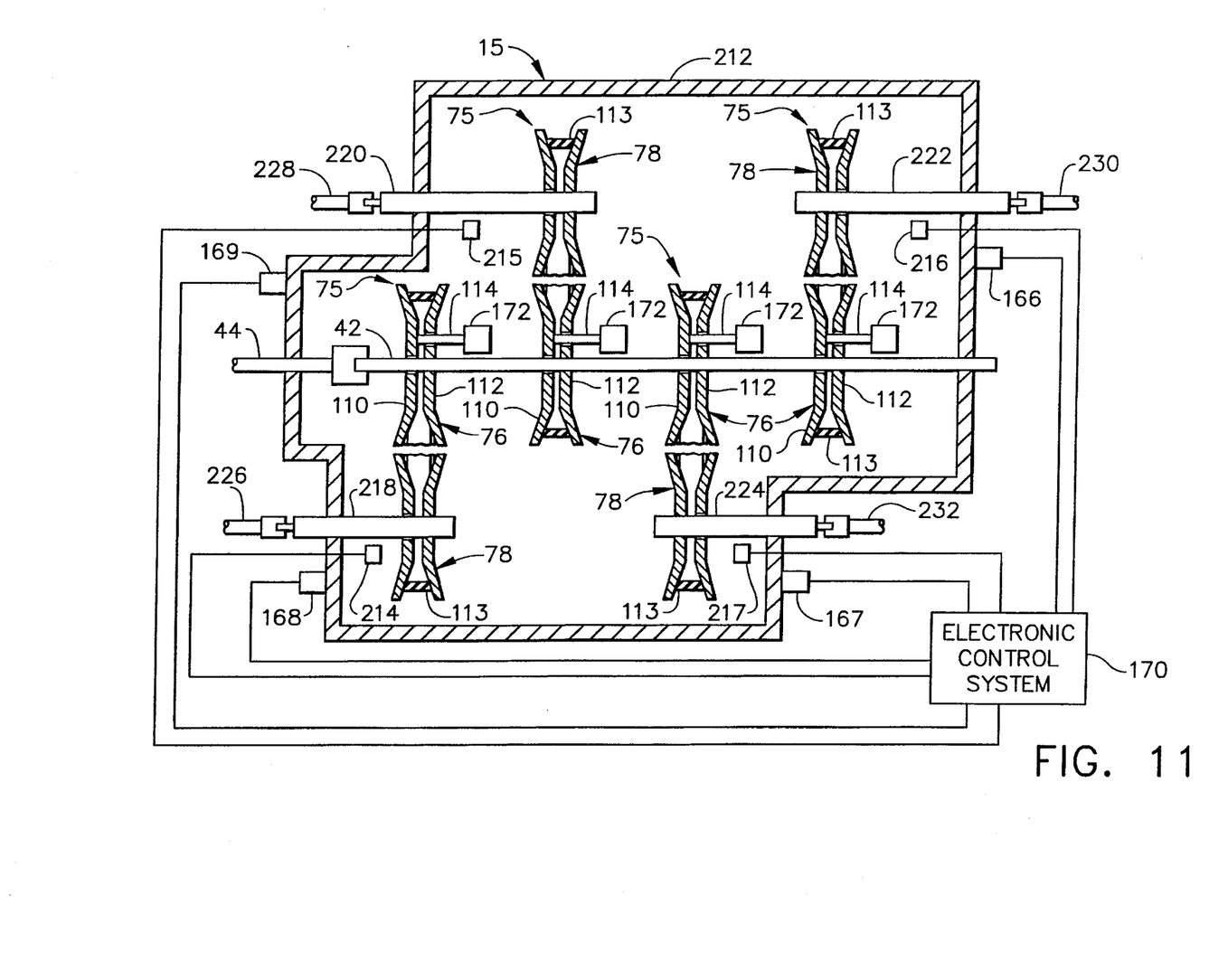
FIG. 11 is a cross-sectional view schematically illustrating the torque distribution subassembly of FIG. 10.

Referring now to FIGS. 10 and 11, another alternative embodiment of the invention is illustrated. Similar to the embodiment of FIGS. 8 and 9, the embodiment of FIGS. 10 and 11 includes a torque distributor subassembly 15 having an input shaft 42 which receives output torque from output shaft 44 of a torque transmitting subassembly 13 of a vehicle. However, in this embodiment, the torque distributor subassembly 15 divides torque from transmitting subassembly 13 between a pair of front output shafts 218 and 220 and a pair of rear output shafts 222 and 224. Front output shafts 218 and 220 are drivingly connected, in a conventional manner, to front drive shafts 228 and 228, respectively, which in turn are drivingly connected to bevel gear sets 234 and 236 for individually and separately driving the front wheels 40 of a vehicle. Bevel gear sets 234 and 236 may typically have a speed reduction ratio in the range of 3.5:1 to 6:1 and more typically may have a speed reduction ratio in the range of 3.5:1 to 4.5:1, for reducing the speed of wheels 40 relative to drive shafts 226 and 228. Rear output shafts 222 and 224 of subassembly 15 are drivingly connected, in a conventional manner, to rear drive shafts 230 and 232, respectively, which in turn are drivingly connected to bevel gear sets 238 and 240 for driving rear wheels 28 of a vehicle. Bevel gear sets 238 and 240 may include a speed reduction ratio in the same range as that for bevel gear sets 234 and 236 for purposes of reducing the speed of wheels 28 relative to rear drive shafts 230 and 232. Accordingly, each of the four wheels of the vehicle are separately and individually driven.

As shown in FIG. 11, torque distributor subassembly 15 further comprises four continuously variable belt drives 75, with each belt drive having a primary pulley 76 mounted on input shaft 42 and driven thereby, and a driven pulley 78 mounted on one of the front output shafts 218 and 220 or on one of the rear output shafts 222 and 224. An electronic control system 170 is provided for controlling four adjustable mechanisms 172 of suitable type, such as described with respect to the embodiment of FIG. 6, and adapted to act upon the hub extension 114 of a moveable sheave 110 of a corresponding belt drive 75. The adjusting mechanisms 172 cause each of the moveable sheaves 110 to shift axially relative to the corresponding fixed sheave 112. As with the embodiment of FIGS. 8 and 9, the belt drives 75 and the adjusting mechanisms 172 of FIGS. 10 and 11 are mounted within housing 212 of torque distributor subassembly 15 in the same manner as belt drives 75 and adjusting mechanisms 172 are mounted to the housing 48 of transfer case 14 of FIG. 6. Also, the moveable sheaves 110 of the embodiment of FIGS. 10 and 11 are spring biased as with previous embodiments.

Torque sensors 166, 167, 168 and 169 are positioned adjacent rear output shafts 222 and 224 and front output shafts 218 and 220, respectively, for measuring torque for each of the corresponding shafts, wherein the output signals from each of sensors 166, 167, 168 and 169 are input to electronic control system 170. Additionally, speed sensors 214, 215, 216 and 217 are positioned adjacent output shafts 218, 220, 222 and 224 respectively, so as to measure the speed of each of the shafts. The output signals from each of the speed sensors 214, 215, 216 and 217 are also input to electronic control system 170. Electronic control system 170 shifts the moveable sheave 110 of each of the belt drives 75 by means of a corresponding one of the adjusting mechanisms 172 in response to the detected torques and speeds sensed from each of the front output shafts 218 and 220 and each of the rear output shafts 222 and 224 so as to divide torque from the input shaft 42 among the front output shafts 218 and 220 and the rear output shafts 222 and 224 in a predetermined relationship and further to ratio speed between the input shaft 42 and each of the front output shafts 218 and 220 and the rear output shafts 222 and 224 in a predetermined relationship. Accordingly, similar to the embodiment of FIGS. 8 and 9, the four-wheel drive system of FIGS. 10 and 11 accomplishes both a torque differentiation function and a speed ratioing function which allows the use of a torque transmitting subassembly 13 which is greatly simplified relative to a conventional transmission as described previously. Furthermore, since each of the front wheels 40 and each of the rear wheels 28 of the embodiment of FIGS. 10 and 11 are driven separately and individually, the front and rear differentials 36 and 24 of the embodiment of FIGS. 8 and 9 are not required, therefore affording additional reduction in complexity and cost of the vehicle.

The four-wheel drive system of the embodiment of FIGS. 10 and 11 also enhances the driveability and fuel economy of the vehicle. Torque may be distributed to each of the four wheels individually based on the intelligent control of electronic control system 170 which receives the aforementioned torque and speed output signals and may further receive a signal from a sensor indicating steering wheel angle and additionally from an accelerometer indicating lateral acceleration of the vehicle which may occur during a skid-out. The electronic control system 170 can then optimize the torque supplied to each of the four wheels individually. In this regard, it is noted that since an intelligent control system is required, the ball ramp system of the embodiment of FIGS. 2–5 may not be used for axially shifting the moveable sheaves 110 of either the embodiment of FIGS. 10 and 11 or the embodiment of FIGS. 8 and 9. The four-wheel drive system of FIGS. 10 and 11 provides a very smooth "equivalent transmission" and furthermore, as the speed of the vehicle is increased the ratio of each of the belt drives 75 may be gradually changed so that the engine speed never changes and if desired, may operate at a maximum fuel economy speed.

The transfer case and torque distributor subassembly for the four-wheel drive system of the invention have been illustrated and described by what are considered to represent preferred embodiments thereof. Although described in terms of preferred embodiments, it should be appreciated that various modifications could be made without departing from the spirit or scope of the invention as defined by the attached claims.

What is claimed is:

1. A full time four-wheel drive system for a vehicle, comprising:

a torque distributor subassembly including an input shaft for receiving output torque from a torque transmitting subassembly of a vehicle, a plurality of output shafts including at least one front output shaft for driving at least one front wheel of said vehicle and at least one rear output shaft for driving at least one rear wheel of said vehicle, and connecting means for drivingly connecting said input shaft to each of said output shafts such that each of said output shafts may receive torque from said input shaft and rotate at a given speed in response to said torque received from said input shaft;

said connecting means comprising at least one continuously variable belt drive, said belt drive having a drive pulley mounted on said input shaft and driven thereby and a driven pulley mounted on at least one of said output shafts, at least one of said pulleys comprising a pair of sheaves with at least one sheave being axially moveable in relation to the other sheave of said pair, said pulleys carrying a belt therebetween;

means for shifting said at least one sheave axially in response to at least the torque applied to each of said output shafts, wherein said means for shifting is responsive to divide torque from said input shaft among said output shafts in a predetermined relationship, said means for shifting being further responsive to ratio speed between said input shaft and each of said output shafts in a predetermined relationship; and said means for shifting comprising an electronic control system having signals corresponding to at least the torque input to each of said output shafts, said electronic control system controlling at least one adjusting mechanism for shifting said moveable sheave.

2. The four-wheel drive system as recited in claim 1, wherein:

said plurality of output shafts comprises a front output shaft and a rear output;

said connecting means includes a pair of said continuously variable belt drives, a first one of said pair of belt drives connecting said input shaft to said front output shaft and a second one of said pair of belt drives connecting said input shaft to said rear output shaft; and said means for shifting is responsive to divide torque from said input shaft between said front and rear output shafts in a predetermined relationship and to ratio speed between said input shaft and said front and rear output shafts.

3. The four-wheel drive system as recited in claim 2, wherein:

said electronic control system includes measuring means positioned adjacent said front and rear output shafts to measure the torque of said output shafts.

4. The four-wheel drive system as recited in claim 2, wherein said electronic control system includes measuring means positioned adjacent said front and rear output shafts to measure the speed of said output shafts.

5. The four-wheel drive system as recited in claim 2, wherein:

said at least one adjusting mechanism comprises a pair of adjusting mechanisms, each being connected to corresponding ones of said pair of belt drives, each of said adjusting mechanisms comprising an electric motor having a housing and a rotor rotatably supported in said motor housing, said rotor coupled to an axially moveable shift collar supported on said input shaft and connected to said moveable sheave, wherein rotation of said rotor will cause axial movement of said shift collar and said moveable sheave.

6. The four-wheel drive system as recited in claim 1, wherein:

said plurality of output shafts comprises a pair of front output shafts and a pair of rear output shafts;

said connecting means includes four of said continuously variable belt drives, each of said front output shafts and rear output shafts being connected to said input shaft by a corresponding one of said belt drives; and said means for shifting is responsive to divide torque from said input shaft among said front output shafts and rear output shafts in a predetermined relationship and to ratio speed between said input shaft and each of said front and rear output shafts in a predetermined relationship.

7. The four-wheel drive system as recited in claim 6, wherein each of said pair of front output shafts is drivingly connected to a front wheel of the vehicle and each of said pair of rear output shafts is drivingly connected to a rear wheel of the vehicle.

8. The four-wheel drive system as recited in claim 6, wherein:

said electronic control system includes measuring means positioned adjacent each of said front and rear output shafts to measure the torque of each of said output shafts.

9. The four-wheel drive system as recited in claim 6, wherein said electronic control system includes measuring means positioned adjacent each of said front and rear output shafts to measure the speed of said output shafts.

10. The four-wheel drive system as recited in claim 6, wherein:

said at least one adjusting mechanism comprises four of said adjusting mechanisms, each being connected to corresponding ones of said four belt drives, each of said adjusting mechanisms comprising an electric motor having a housing and a rotor rotatably supported in said motor housing, said rotor coupled to an axially moveable shift collar supported on said input shaft and connected to said moveable sheave, wherein rotation of said rotor will cause axial movement of said shift collar and said moveable sheave.

\* \* \* \* \*